(12) United States Patent
Lee et al.

(10) Patent No.: US 11,587,205 B2
(45) Date of Patent: Feb. 21, 2023

(54) METHOD AND DEVICE FOR GENERATING AVATAR ON BASIS OF CORRECTED IMAGE

(71) Applicant: Samsung Electronics Co., Ltd., Suwon-si (KR)

(72) Inventors: Wooyong Lee, Suwon-si (KR); Jungeun Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 17/309,105

(22) PCT Filed: Oct. 17, 2019

(86) PCT No.: PCT/KR2019/013672
§ 371 (c)(1),
(2) Date: Apr. 23, 2021

(87) PCT Pub. No.: WO2020/085718
PCT Pub. Date: Apr. 30, 2020

(65) Prior Publication Data
US 2022/0084168 A1 Mar. 17, 2022

(30) Foreign Application Priority Data
Oct. 24, 2018 (KR) .......................... 10-2018-0127554

(51) Int. Cl.
*G06T 5/00* (2006.01)
*G06T 11/00* (2006.01)
*G06T 15/04* (2011.01)

(52) U.S. Cl.
CPC ............ *G06T 5/001* (2013.01); *G06T 11/001* (2013.01); *G06T 15/04* (2013.01); *G06T 2207/20092* (2013.01); *G06T 2207/30201* (2013.01)

(58) Field of Classification Search
CPC ....... G06T 11/40; G06T 11/001; G06T 19/20; G06T 5/00; G06T 5/002;
(Continued)

(56) References Cited

U.S. PATENT DOCUMENTS

2012/0113106 A1 5/2012 Choi et al.
2018/0091732 A1* 3/2018 Wilson ............... H04N 5/23219
(Continued)

FOREIGN PATENT DOCUMENTS

JP 2016136324 A * 7/2016 .......... A63F 13/655
KR 10-2003-0091306 A 12/2003
(Continued)

OTHER PUBLICATIONS

International Search Report and Written Opinion of the International Searching Authority in connection with International Application No. PCT/KR2019/013672 dated Jan. 23, 2020, 11 pages.

*Primary Examiner* — Wesner Sajous

(57) ABSTRACT

Disclosed in various embodiments of the present invention are a method and a device, the device comprising a camera, a display, and a processor, wherein the processor is configured to display, on the display in a preview state, a user's face acquired from the camera, correct the user's face on the basis of a configuration related to face correction, acquire an image including the corrected user's face when an avatar generation request is received, and generate an avatar by using the acquired image. Various embodiments are possible.

13 Claims, 10 Drawing Sheets

(58) Field of Classification Search
CPC ..... G06T 2219/2024; G06T 2219/2021; G06T 7/246; G06T 2207/20092; G06T 2207/30201; G06T 2200/24; G06T 7/70; G06T 3/60; G06T 13/40; G06F 3/012; G06F 3/0304; G06F 3/011; G06F 3/04815; G06F 3/017; G06F 3/04817; G06F 3/0488; G06F 3/0481; G06V 40/168; G06V 40/164; G06V 40/176; H04L 51/226; H04L 51/046; H04L 51/10; H04L 51/214

See application file for complete search history.

(56) References Cited

U.S. PATENT DOCUMENTS

| | | | | |
|---|---|---|---|---|
| 2020/0051304 | A1* | 2/2020 | Choi | G06T 15/20 |
| 2020/0175581 | A1* | 6/2020 | Choi | G06F 3/002 |
| 2020/0358725 | A1* | 11/2020 | Scapel | G06V 40/164 |
| 2020/0358726 | A1* | 11/2020 | Dryer | H04L 51/046 |

FOREIGN PATENT DOCUMENTS

| | | | | | |
|---|---|---|---|---|---|
| KR | 10-2007-0011006 | A | | 1/2007 | |
| KR | 10-2010-0028689 | A | | 3/2010 | |
| KR | 20100028689 | A | * | 3/2010 | ............ G06T 13/80 |
| KR | 10-2012-0047616 | A | | 5/2012 | |
| KR | 20120047616 | A | * | 5/2012 | ............ G06T 17/00 |
| KR | 10-2014-0002131 | A | | 1/2014 | |
| KR | 10-1866407 | B1 | | 6/2018 | |
| WO | 2018057272 | A1 | | 3/2018 | |

\* cited by examiner (510)

(530)

(520)

(540)

(710)

(720)

(730)

METHOD AND DEVICE FOR GENERATING AVATAR ON BASIS OF CORRECTED IMAGE

CROSS-REFERENCE TO RELATED APPLICATIONS

This application is a 371 National Stage of International Application No. PCT/KR2019/013672 filed Oct. 17, 2019, which claims priority to Korean Patent Application No. 10-2018-0127554 filed Oct. 24, 2018, the disclosures of which are herein incorporated by reference in their entirety.

BACKGROUND

1. Field

Various embodiments relate to a method and device for generating an avatar using a corrected image.

2. Description of Related Art

With the recent development of digital technology, various types of electronic devices such as mobile communication terminals, personal digital assistants (PDAs), electronic notebooks, smart phones, tablet personal computers (PCs), and wearable devices are widely used. In order to support and increase functions of the electronic device, the hardware part and/or the software part of the electronic device are continuously improved.

Meanwhile, online communities such as social network services (or sites) (SNS) and messenger services have been started, and users use such communities as a medium to share and communicate their ideas in everyday life with others online. Moreover, users prefer to have their own customized clothing and accessories that are distinct from others, and this phenomenon is also appearing online. For example, using a user image (e.g., a selfie), an electronic device generates and provides an avatar or an emoji that resembles a user. For example, the electronic device may select a face model similar to a user from various types of avatar face models defined in advance, and may apply eyes, a nose, and a mouth to the selected face model on the basis of facial feature points extracted from the user image. In addition, items such as the avatar's body shape, hair style, clothes, hat, and glasses may be directly selected by the user from among those previously defined in the electronic device and reflected on the avatar.

SUMMARY

A conventional electronic device generates an avatar based on a user image before correction, thereby reflecting the user's face on the avatar as it is. The avatar is for expressing the user's personality, and the user's personality can be expressed in various ways not only with the user's face, but also with makeup methods, stickers, and the like. However, the electronic device does not reflect user characteristics other than the user's face on the avatar.

In various embodiments, disclosed is a method and device for correcting an image obtained by capturing a user's face and generating an avatar, thereby providing an avatar similar to a user and revealing a user's personality.

An electronic device according to various embodiments may include: a camera; a display; and a processor, wherein the processor is configured to: display a user's face acquired from the camera on the display in a preview state; correct the user's face based on a configuration related to face correction; acquire an image including the corrected user's face when an avatar generation request is received; and generate an avatar by using the acquired image.

An electronic device according to various embodiments may include: a camera; a display; and a processor, wherein the processor is configured to: display a user's face acquired from the camera on the display in a preview state; correct the user's face based on a configuration related to face correction; acquire correction information corresponding to the corrected user's face when an avatar generation request is received; and generate an avatar using the acquired correction information.

A method of operating an electronic device according to various embodiments may include: displaying a user's face acquired from a camera of the electronic device in a preview state; correcting the user's face based on a configuration related to face correction; acquiring, when an avatar generation request is received, correction information corresponding to the corrected user's face; and generating an avatar using the acquired correction information.

According to various embodiments, an avatar similar to a user and revealing a user's personality may be provided by correcting an image obtained by capturing a user's face and generating an avatar using the corrected image.

According to various embodiments, since a desired correction area or degree of correction may be different for each user, a personalized avatar reflecting the desired correction area or degree of correction may be generated.

DETAILED DESCRIPTION

Figure 1:
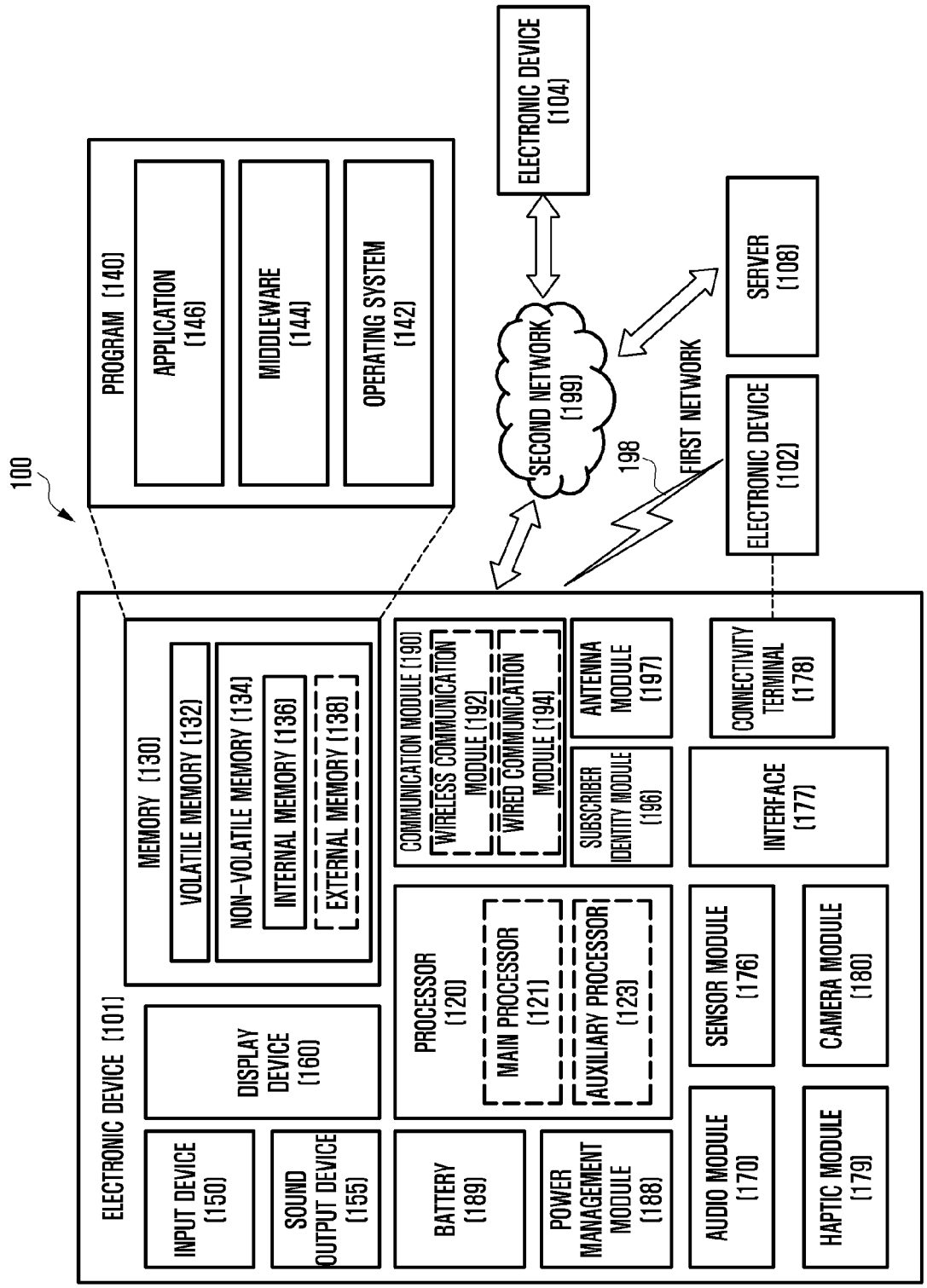
FIG. 1 is a block diagram illustrating an electronic device 101 in a network environment 100 according to various embodiments.

The electronic device according to various embodiments may be one of various types of electronic devices. The electronic devices may include, for example, a portable communication device (e.g., a smart phone), a computer device, a portable multimedia device, a portable medical device, a camera, a wearable device, a home appliance, or the like. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), the element may be coupled with the other element directly (e.g., wiredly), wirelessly, or via a third element.

As used herein, the term "module" may include a unit implemented in hardware, software, or firmware, or any combination thereof, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

FIG. 1 is a block diagram illustrating an example electronic device 101 in a network environment 100 according to various embodiments.

Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to an embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, or a keyboard.

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector), The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to an example embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may include one or more antennas, and, therefrom, at least one antenna appropriate for a communication scheme used in the communication network, such as the first network 198 or the second network 199, may be selected, for example, by the communication module 190 (e.g., the wireless communication module 192). The signal or the power may then be transmitted or received between the communication module 190 and the external electronic device via the selected at least one antenna.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the "non-transitory" storage medium is a tangible device, and may not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., Play Store™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Figure 2:
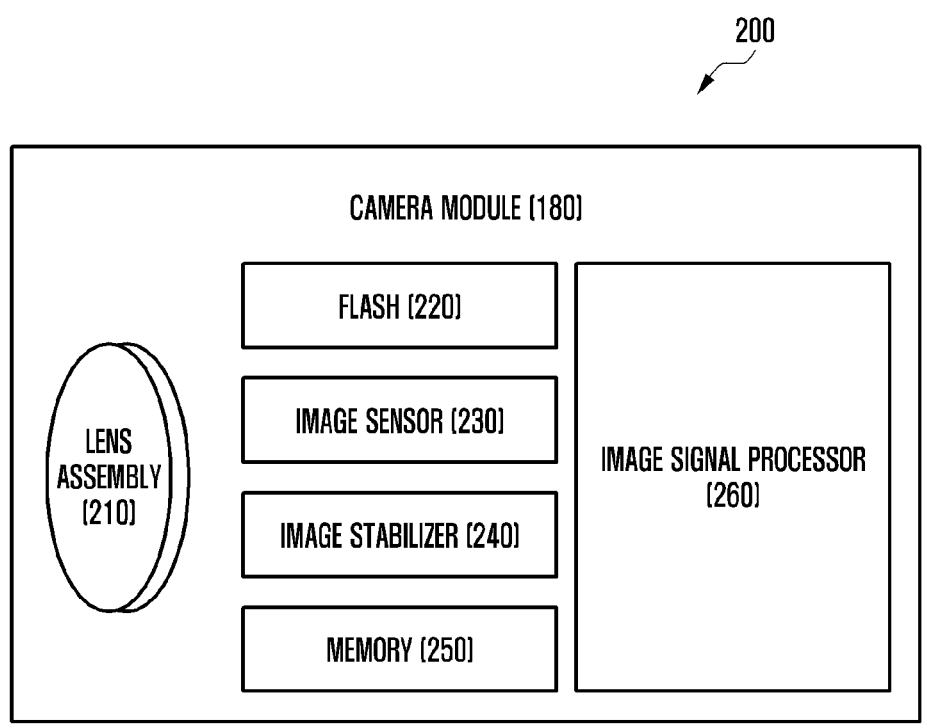
FIG. 2 is a block diagram 200 illustrating a camera module 180 according to various embodiments.

FIG. 2 is a block diagram 200 illustrating the camera module 180 according to various embodiments.

Referring to FIG. 2, the camera module 180 may include a lens assembly 210, a flash 220, an image sensor 230, an image stabilizer 240, memory 250 (e.g., buffer memory), or an image signal processor 260. The lens assembly 210 may collect light emitted or reflected from an object whose image is to be taken. The lens assembly 210 may include one or more lenses. According to an embodiment, the camera module 180 may include a plurality of lens assemblies 210. In such a case, the camera module 180 may form, for example, a dual camera, a 360-degree camera, or a spherical camera. Some of the plurality of lens assemblies 210 may have the same lens attribute (e.g., view angle, focal length, auto-focusing, f number, or optical zoom), or at least one lens assembly may have one or more lens attributes different from those of another lens assembly. The lens assembly 210 may include, for example, a wide-angle lens or a telephoto lens.

The flash 220 may emit light that is used to reinforce light reflected from an object. According to an embodiment, the flash 220 may include one or more light emitting diodes (LEDs) (e.g., a red-green-blue (RGB) LED, a white LED, an infrared (IR) LED, or an ultraviolet (UV) LED) or a xenon lamp. The image sensor 230 may obtain an image corresponding to an object by converting light emitted or reflected from the object and transmitted via the lens assembly 210 into an electrical signal. According to an embodiment, the image sensor 230 may include one selected from image sensors having different attributes, such as a RGB sensor, a black-and-white (BW) sensor, an IR sensor, or a UV sensor, a plurality of image sensors having the same attribute, or a plurality of image sensors having different attributes. Each image sensor included in the image sensor 230 may be implemented using, for example, a charged coupled device (CCD) sensor or a complementary metal oxide semiconductor (CMOS) sensor.

The image stabilizer 240 may move the image sensor 230 or at least one lens included in the lens assembly 210 in a particular direction, or control an operational attribute (e.g., adjust the read-out timing) of the image sensor 230 in response to the movement of the camera module 180 or the electronic device 101 including the camera module 180. This allows compensating for at least part of a negative effect (e.g., image blurring) by the movement on an image being captured. According to an embodiment, the image stabilizer 240 may sense such a movement by the camera module 180 or the electronic device 101 using a gyro sensor (not shown) or an acceleration sensor (not shown) disposed inside or outside the camera module 180. According to an embodiment, the image stabilizer 240 may be implemented, for example, as an optical image stabilizer. The memory 250 may store, at least temporarily, at least part of an image obtained via the image sensor 230 for a subsequent image processing task. For example, if image capturing is delayed due to shutter lag or multiple images are quickly captured, a raw image obtained (e.g., a Bayer-patterned image, a high-resolution image) may be stored in the memory 250, and its corresponding copy image (e.g., a low-resolution image) may be previewed via the display module 160. Thereafter, if a specified condition is met (e.g., by a user's input or system command), at least part of the raw image stored in the memory 250 may be obtained and processed, for example, by the image signal processor 260. According to an embodiment, the memory 250 may be configured as at least part of the memory 130 or as a separate memory that is operated independently from the memory 130.

The image signal processor 260 may perform one or more image processing with respect to an image obtained via the image sensor 230 or an image stored in the memory 250. The one or more image processing may include, for example, depth map generation, three-dimensional (3D) modeling, panorama generation, feature point extraction, image synthesizing, or image compensation (e.g., noise reduction, resolution adjustment, brightness adjustment, blurring, sharpening, or softening). Additionally or alternatively, the image signal processor 260 may perform control (e.g., exposure time control or read-out timing control) with respect to at least one (e.g., the image sensor 230) of the components included in the camera module 180. An image processed by the image signal processor 260 may be stored back in the memory 250 for further processing, or may be provided to an external component (e.g., the memory 130, the display module 160, the electronic device 102, the electronic device 104, or the server 108) outside the camera module 180. According to an embodiment, the image signal processor 260 may be configured as at least part of the processor 120, or as a separate processor that is operated independently from the processor 120. If the image signal processor 260 is configured as a separate processor from the processor 120, at least one image processed by the image signal processor 260 may be displayed, by the processor 120, via the display module 160 as it is or after being further processed.

According to an embodiment, the electronic device 101 may include a plurality of camera modules 180 having different attributes or functions. In such a case, at least one of the plurality of camera modules 180 may form, for example, a wide-angle camera and at least another of the plurality of camera modules 180 may form a telephoto camera. Similarly, at least one of the plurality of camera modules 180 may form, for example, a front camera and at least another of the plurality of camera modules 180 may form a rear camera.

Figure 3:
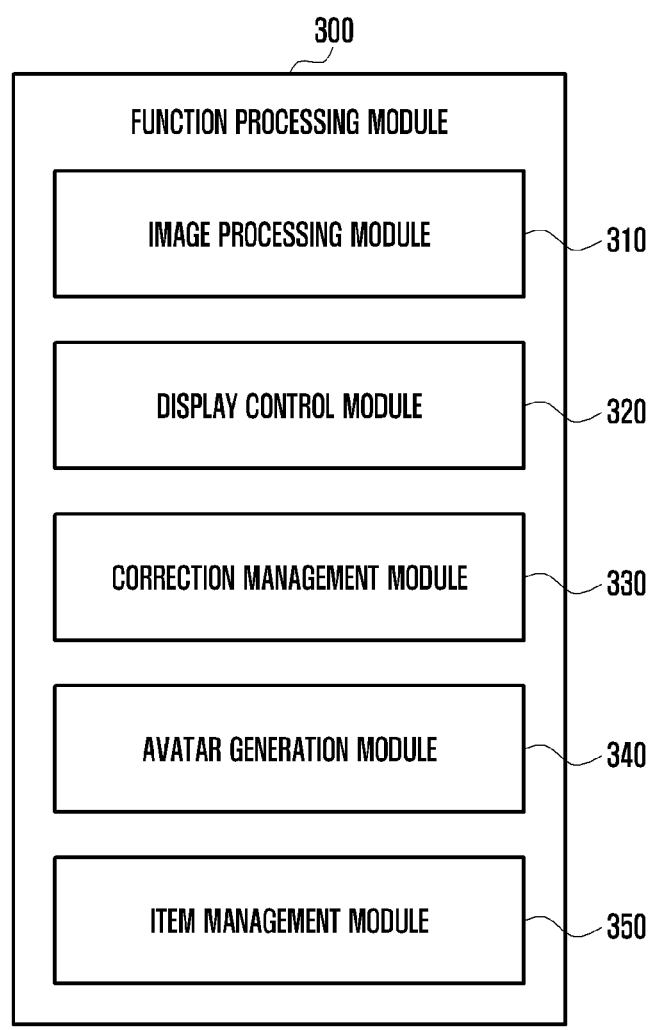
FIG. 3 is a diagram illustrating an example of a function processing module of an electronic device according to various embodiments.

FIG. 3 is a diagram illustrating an example of a function processing module of an electronic device according to various embodiments.

Referring to FIG. 3, a function processing module 300 may be included as a hardware module in a processor (e.g., the processor 120 of FIG. 1) including a processing circuitry, or may be included as a software module (e.g., the program 140). The function processing module 300 may include an image processing module 310, a display control module 320, a correction management module 330, an avatar generation module 340, or an item management module 350.

The image processing module 310 may process an image captured by a camera (e.g., the camera module 180 of FIG. 1) of an electronic device (e.g., the electronic device 101 of FIG. 1). Here, the image may include a user's face. For example, the user may select (or touch) an icon corresponding to a camera application displayed on the background screen of the electronic device 101 to execute the camera application. The camera module 180 may be driven by the executed camera application, and the image processing module 310 may correct a user's face acquired from the camera module 180. The camera module 180 may be configured in an avatar photographing mode according to a user input while the user's face is displayed as a preview on the display device 160. The camera module 180 may be driven in one or more photographing modes. For example, the photographing mode may include a general photographing (or automatic) mode, a selfie mode, a food photographing mode, or an avatar photographing mode. The camera module 180 may take a picture in a different manner depending on the photographing mode. The avatar photographing mode may be a mode capable of generating an avatar from a photographed image. When the user of the electronic device 101 selects a 'photograph button' in the avatar photographing mode, the electronic device 101 may generate an avatar using the photographed image.

According to various embodiments, the image processing module 310 may correct the user's face displayed in the preview state based on a configuration related to face correction. The configuration related to the face correction may include a configuration of the electronic device 101 or a user input. The image processing module 310 may include various image processors (e.g., an image signal processor, a central processing unit, a graphic processing unit, and a digital processing processor), and may correct a user's face by the various image processors. The image processing module 310 may recognize a user's face from an image acquired from the camera module 180 and may correct an area corresponding to the recognized face. For example, the image processing module 310 may analyze facial feature points from the image and may detect a face area including eyes, nose, and mouth. The face area may or may not contain hair. For example, the image processing module 310 may determine face information such as shape, size, and location for each of the face, eyes, nose, and mouth using the feature points, and may correct the face area based on the determined face information.

According to various embodiments, the image processing module 310 may correct at least one of a face shape correction, a skin color correction, an eyes/nose/mouth correction, a lighting adjustment, and a left and right inversion for the face area. The image processing module 310 may correct the at least one of the face shape correction, the skin color correction, the eyes/nose/mouth correction, the lighting adjustment, and the left and right inversion for the face area according to the configuration (e.g., predetermined information) of the electronic device 101. For example, correction information for correcting a user's face may be configured in the electronic device 101 according to at least one of gender, age, race, or country of the user of the electronic device 101. The image processing module 310 may automatically correct the face area based on predetermined information.

According to various embodiments, the face shape correction may be to make the face size smaller or make the chin line slimmer. The skin color correction may be to express the skin color brightly or remove blemishes (e.g., spots, age spots, or freckles) contained in the skin. The eyes/nose/mouth correction may be to sharpen the shape of the pupils, nose, and mouth, enlarge the eye size, or increase the height of the nose. The lighting adjustment may be to change the position (e.g., up, down, left, and right) of a lighting or adjust the brightness of the lighting. The image processing module 310 may provide (or display) a button (or an icon) for the lighting, and may change the position of the lighting according to a selection of a lighting button (e.g., a toggle button). The left and right inversion may be to invert the left and right of the face area. The image processing module 310 may provide (or display) a left and right reverse button, and may reverse a user's face left and right according to a selection of the left and right reverse button. The image processing module 310 may adjust a degree (or level) of correcting a user's face based on a configuration of the electronic device 101 or a user input.

According to various embodiments, the image processing module 310 may correct the at least one of the face shape correction, the skin color correction, the eyes/nose/mouth correction, the lighting adjustment, and the left and right inversion for the face area based on a user input. The image processing module 310 may recognize an area to be corrected based on the user input. For example, the image processing module 310 may correct a face shape when a user in the face area selects a chin line (or chin boundary), may correct a skin color when the user selects a cheek, and may correct eyes when the user selects eyes. Alternatively, the image processing module 310 may receive a selection of the area to be corrected (e.g., face shape, skin color, or eye size) through a selection button from the user, and may correct the selected correction area. The image processing module 310 may correct a user's face in a preview state according to a user input. The user can check his or her face corrected in real time and may determine whether to correct it.

According to various embodiments, the image processing module 310 may transmit correction information to the correction management module 320. The correction information may be used to generate an avatar. For example, the correction information may include at least one of a correction area, a correction degree, or a correction item. The correction area may indicate a corrected position and may indicate whether the corrected one is a face shape, a skin color, or an eye size. The correction degree may indicate how much correction has been made. The correction item may include whether to correct the lighting or left and right inversion. In addition, the image processing module 310 may store an image before correction (e.g., an original image) or an image after correction (e.g., a corrected image) in a memory (e.g., the memory 130 of FIG. 1). Alternatively, the image processing module 310 may transmit the image before correction or the image after correction to the avatar generation module 340.

The display control module 320 may display the user's face acquired from the camera module 180 by the camera application executed based on the user input of the electronic device 101, on the display (e.g., the display device 160) in the preview state. The display control module 320 may provide a user interface for correcting the user's face acquired in the preview state. For example, the user interface may include a button for selecting an area to be corrected (e.g., face shape, eyes, nose, or mouth) and a correction adjustment bar (or an adjustment button) for adjusting the degree of correction. The selection button or the adjustment button may be displayed in the form of an icon. The display control module 320 may display the corrected user's face on the display device 160 in the form of a preview.

According to various embodiments, the display control module 320 may provide an item button for adding an item (or a sticker or an accessory) to the user's face or the background. The item may include all types of objects or effects that can be added to the user's face or background displayed in a preview form. For example, the item may include glasses, a hat, a beard, a headband, clouds, stars, and animal pictures (e.g., dog image or cat image). The display control module 320 may allow an item list including at least one item to be included in a user interface for adjusting the face correction, and may provide the user interface. All items may not be displayed in the item list at once. The item list may include buttons for each item type, and when the item type button is selected, the display control module 320 may provide various items included in the item type. For example, in a case in which the item type is glasses, a hat, or a beard, when the glasses are selected, the display control module 320 may provide glasses items corresponding to glasses 1, glasses 2, glasses 3, and glasses 4 each having a different shape.

According to various embodiments, the display control module 320 may preferentially provide an item that is most searched for based on big data or a usage history of the electronic device 101. The order of arranging (or displaying) items included in the item list may be changed according to a configuration of the electronic device 101 or a user's selection. When the item button is selected, the display control module 320 may display the item list including at least one item on the display device 160. When an item is selected by the user, the display control module 320 may position the selected item on the user's face or the background based on the type of the selected item. For example, when the selected item is glasses, the display control module 320 may display the glasses on the user's face to match the two eyes.

According to various embodiments, the display control module 320 may change the size or position of the selected item based on a user input. For example, when a user input (e.g., a long touch) for pressing long the item is detected, the display control module 320 may determine that the user input is for changing the size of the item. The display control module 320 may display a rectangular frame surrounding the item so as to change the size of the item, and may change the size of the item by receiving an input for reducing or increasing the rectangular frame from the user. When a user input for touching (or selecting) the item and moving (e.g., dragging) the item while maintaining the touch is detected, the display control module 320 may determine that the user input is for changing the position of the item. The display control module 320 may change the position of the item based on the user input, and may position (or arrange) the item at a position where the user input is released (e.g., touch release). When an item is added, the display control module 320 may transmit the added item information to the correction management module 330 or the item management module 350. The item information is information related to an item, and may include, for example, at least one of an identifier, a name, a type, a location, and a size.

The correction management module 330 may manage correction information. The correction information may include at least one of a correction area, a correction degree, or a correction item. The correction management module 330 may store correction information corresponding to the corrected user's face in the memory 130. The correction management module 330 may manage each piece of information (e.g., a correction area, a correction degree, and a correction item) included in the correction information, or may integrate and manage each piece of information included in the correction information. The correction management module 330 may provide the correction information to the avatar generation module 340.

The avatar generation module 340 may generate an avatar based on the corrected user's face. The avatar generation module 340 may generate an avatar using the corrected image received from the image processing module 320. The corrected image may be an image including the user's face corrected in the preview state. The avatar generation module 340 may generate the avatar based on the correction information received from the correction management module 330. The avatar generation module 340 may generate the avatar based on the image before correction (e.g., an original image), and may apply the correction information to the generated avatar. For example, the avatar generation module 340 may generate an avatar that resembles a user and may apply the correction information to the avatar by expanding the eye size of the avatar or slimming the face shape of the avatar according to the correction information.

According to various embodiments, the avatar generation module 340 may configure an avatar model or a texture of the avatar model based on the correction information. The avatar model may have a 2D or 3D basic avatar shape. The avatar model may be configured in advance according to gender, age, and race. The avatar generation module 340 may determine the avatar model based on each piece of information included in the correction information (e.g., a correction area, a correction degree, and a correction item), or may integrate each piece of information included in the correction information to determine the avatar model. When the avatar model is in a 3D form, since the corrected image has a 2D form, when the avatar generation module 340 configures the 3D avatar model using the 2D corrected image, the same correction method may not be applied. The avatar generation module 340 may generate an avatar by associating (or matching) correction information of the 2D corrected image with the 3D avatar model.

For example, the avatar generation module 340 may select an avatar model based on the correction information and may configure the texture of the avatar model based on the corrected image, thereby generating an avatar. When the correction information enlarges the eye size or adjusts the jawline, the avatar generation module 340 may select an avatar model with large eyes and a thin jawline. Alternatively, the avatar generation module 340 may generate an avatar by selecting an avatar model based on the corrected image and configuring the texture of the avatar model based on the correction information.

According to various embodiments, the avatar generation module 340 may generate an avatar to which an item is applied. The avatar generation module 340 may receive an item or item information from the item management module 350 and may generate an avatar to which the item is applied based on the received item or item information. For example, when an item size or location is changed by a user, the avatar generation module 340 may apply the item to the avatar based on item information about the changed item size or location.

According to various embodiments, the avatar generation module 340 may generate an avatar using an image before correction and may then change the avatar based on an additional user input. For example, the image before correction may be obtained by performing image processing such as removing noise from the original image including the user's face. The avatar generation module 340 may generate the avatar from the image before correction, and may apply a filter to the avatar or add an item based on a user selection. For example, the filter may include a light filter that controls light or a color filter that corrects color. The avatar generation module 340 may correct the generated avatar.

The item management module 350 may manage items. An item used (or applied) in a general photographing mode and an item (e.g., an avatar item) used in an avatar photographing mode may be different. When the camera module 180 is in an item photographing mode, user inconvenience may be caused if an item used in the general photographing mode cannot be used. The item management module 350 may manage items so that items used in the general photographing mode can be used even in the avatar photographing mode. For example, the item management module 350 may store items used in the general photographing mode in a database (e.g., the memory 130) related to the avatar item. The avatar item may include all types of objects applicable to the avatar. The avatar item may include hair (e.g., a hat), clothing (e.g., a shirt, pants, a skirt, or a dress), and accessories (e.g., glasses, sunglasses, or earrings). The avatar management module 350 may separately manage the item so that an item that can be added to the user's face or background displayed in a preview form can be applied to the avatar.

According to various embodiments, the avatar management module 350 may take the item of the general photographing mode as it is and may store the item in the database, or may process the item of the general photographing mode to fit the avatar and store the item in the database. The avatar management module 350 may build the database in advance or may build a database for items added by the user. The avatar management module 350 may store item information (e.g., identifier, name, or type) on the item in the general photographing mode. When an item size or location is changed by the user, the avatar management module 350 may further store item information on the changed item size or location. The item management module 350 may provide the item or the item information to the avatar generation module 340.

An electronic device (e.g., the electronic device 101) according to various embodiments may include: a camera (e.g., the camera module 180); a display (e.g., the display device 160); and a processor (e.g., the processor 120), wherein the processor is configured to: display a user's face acquired from the camera on the display in a preview state; correct the user's face based on a configuration related to face correction; acquire an image including the corrected user's face when an avatar generation request is received; and generate an avatar by using the acquired image.

The processor may be configured to: adjust the configuration related to the face correction based on a user input received during at least a portion of the displaying; and display the corrected user's face on the display based on the adjusted configuration related to the face correction.

The processor may be configured to: add, when an item addition request is received, an item to the user's face; and generate an avatar to which the item is applied according to the item generation request.

The processor may be configured to: provide an item list including at least one item based on a user input for calling up an item; receive a selection of any one item from the item list; and display the item on the user's face or a background based on a type of the selected item.

The processor may be configured to: apply an item to the avatar based on information on the item displayed on the user's face or the background.

The processor may be configured to: apply a filter to the generated avatar or add an item thereto based on an additional user input.

An electronic device (e.g., the electronic device 101) according to various embodiments may include: a camera (e.g., the camera module 180); a display (e.g., the display device 160); and a processor (e.g., the processor 120), wherein the processor is configured to: display a user's face acquired from the camera on the display in a preview state; correct the user's face based on configured information; acquire correction information corresponding to the corrected user's face when an avatar generation request is received; and generate an avatar using the acquired correction information.

The correction information may include at least one of a correction area, a correction degree, or a correction item, and the processor may be configured to: generate an avatar based on the correction information.

The processor may be configured to: generate the avatar by selecting an avatar model based on the correction information and configuring a texture of the selected avatar model based on an image including the corrected user's face.

The processor may be configured to: select an avatar model based on the correction information or select an avatar model by integrating information included in the correction information.

The electronic device may further include: a memory (e.g., memory 130), and the processor may be configured to: store a user image including the user's face before correction in the memory; generate an avatar based on the user image; and apply the correction information to the generated avatar.

The processor may be configured to: generate different avatars according to the correction information.

The processor may be configured to: add, when an item addition request is received, an item to the user's face; and generate an avatar to which the item is applied according to the avatar generation request.

The processor may be configured to: apply, when a size or location of the item is changed by a user input corresponding to the item, the item to the avatar based on item information on the changed size or location of the item.

Figure 4:
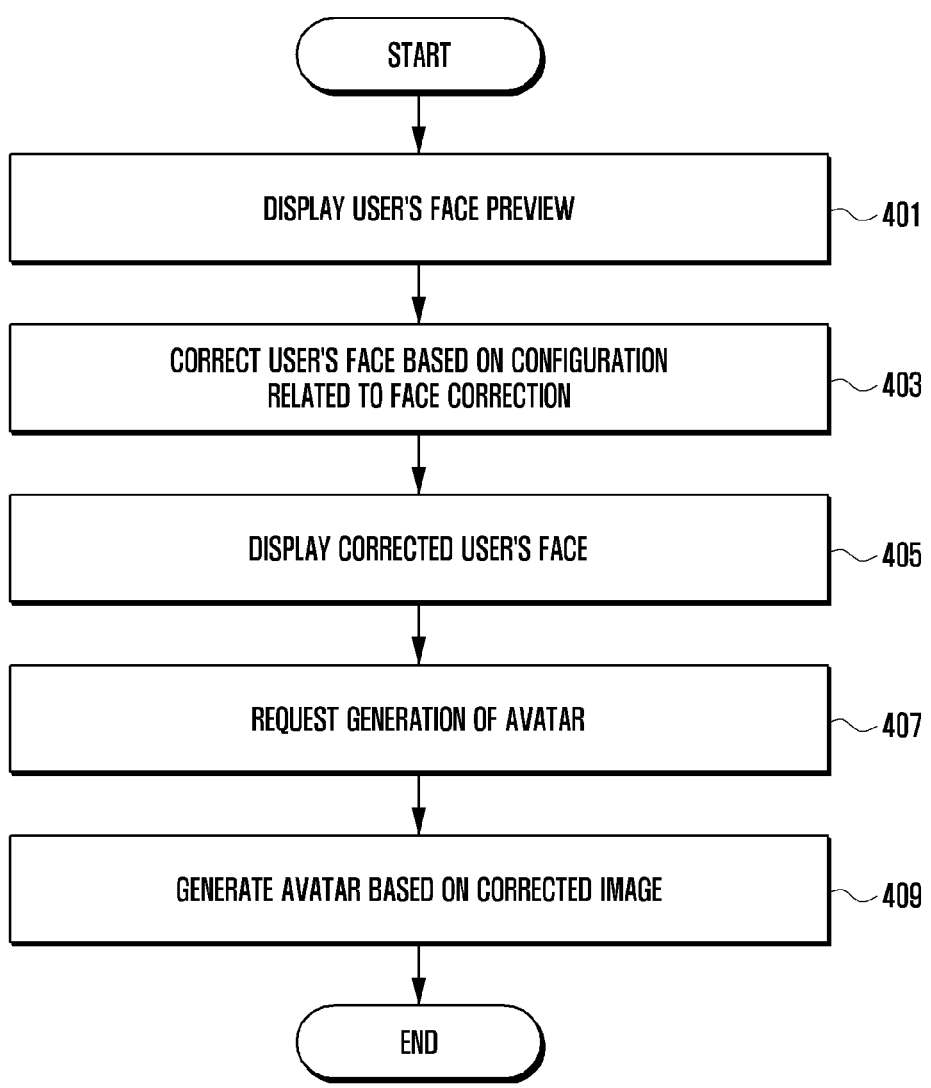
FIG. 4 is a flowchart illustrating a method of generating an avatar based on a corrected image in an electronic device according to various embodiments.

FIG. 4 is a flowchart illustrating a method of generating an avatar based on a corrected image in an electronic device according to various embodiments.

Referring to FIG. 4, in operation 401, a processor (e.g., the processor 120 of FIG. 1 or the function processing module 300 of FIG. 3) of an electronic device (e.g., the electronic device 101 of FIG. 1) may display a user's face on a display (e.g., the display device 160) in a preview form. The processor 120 (e.g., the display control module 320) may execute a camera application based on a user input, and may display the user's face acquired from the camera (e.g., the camera module 180 of FIG. 1) by the executed camera application, on the display (e.g., the display device 160) in a preview state. The camera module 180 may be configured in an avatar photographing mode according to a user input. The avatar photographing mode may be a mode capable of generating an avatar from a photographed image.

In operation 403, the processor 120 (e.g., the image processing module 320) may correct the user's face based on a configuration related to face correction. The configuration related to the face correction may include a configuration of the electronic device 101 or a user input. For example, when the user input is not detected, the processor 120 may correct the user's face based on the configuration of the electronic device 101. Correction information for correcting the user's face according to at least one of gender, age, race, or country of the user of the electronic device 101 may be configured in the electronic device 101. The configuration of the electronic device 101 may include most suitable correction information for correcting the user's face according to the at least one of gender, age, race, or country. The processor 120 may correct at least one of a face shape correction, a skin color correction, an eyes/nose/mouth correction, a lighting adjustment, and a left and right inversion for the face area according to the configuration of the electronic device 101.

According to various embodiments, the processor 120 may correct the user's face by adjusting the configuration related to the face correction based on a user input received during at least a portion of the displaying. The user input may be for selecting an area to be corrected or for adjusting a degree of correction. For example, the processor 120 may detect a user input for touching (or selecting) a position where the chin (e.g., for face shape correction), cheeks (e.g., for skin color correction), or eyes, nose, and mouth are displayed, from the user's face. The user input detected from the user's face may be to select a correction area. When the user input is detected in the cheeks from the user's face, the processor 120 may correct the skin color. Alternatively, when the user input is detected in the eyes from the user's face, the processor 120 may correct the eyes (e.g., pupil sharpness or eye size). Alternatively, the processor 120 may correct the selected correction area based on the configuration of the electronic device 101 or a user input. For example, when the correction area is selected, the processor 120 may correct the correction area with the most appropriate degree of correction according to the configuration of the electronic device 101.

According to various embodiments, the processor 120 may provide a user interface including a correction adjustment bar (or an adjustment button) for adjusting a degree of correction together with the user's face displayed in the preview state. The correction adjustment bar may be provided in the form of a bar or button divided into correction levels from 0 to 10. The correction level is only described to aid understanding and does not limit the disclosure by description. When the correction area is selected, the processor 120 may display the correction adjustment bar. The processor 120 may adjust the degree of correction according to a user input for moving (or dragging) the correction adjustment bar to the left or right. The user interface may further include a selection button for selecting the correction area. The selection button may include respective buttons related to face shape, skin color, eyes, nose, and mouth. The processor 120 may detect a user input of touching (or selecting) a selection button related to the correction area. When the user input of touching the selection button is detected, the processor 120 may display the adjustment bar for adjusting the degree of correction.

In operation 405, the processor 120 (e.g., the display control module 320) may display the corrected user's face. The processor 120 may correct the user's face displayed in the preview state in real time based on the configuration of the electronic device 101 or the user input, and may reflect the corrected items (e.g., correction area or correction degree) to the user's face in real time, thereby displaying the user's face on the display device 160.

In operation 407, the processor 120 (e.g., the avatar generation module 340) may receive a request for generation of to an avatar. For example, when checking his or her corrected face in the preview state and desiring to generate an avatar with the corrected face, the user may request the generation of an avatar by selecting a photographing button. When a user's face acquired in an avatar photographing mode is corrected in the preview state and the photographing button is selected, the processor 120 may determine that there is a request of the generation of the avatar from the user. The processor 120 may acquire an image (e.g., a user image) including the corrected user's face based on the avatar generation request. The processor 120 may store the acquired image in a memory (e.g., the memory 130 of FIG. 1).

In operation 409, the processor (e.g., the avatar generation module 340) may generate the avatar based on the corrected image. The corrected image may be an image including the user's face corrected in the preview state. The processor 120 may provide the avatar capable of representing a user's personality in addition to the user's facial features by generating the avatar with the corrected image. The processor 120 may display the generated avatar on the display device 160. According to various embodiments, the processor 120 may apply a filter or add an item to the generated avatar based on an additional user input.

Figure 5:
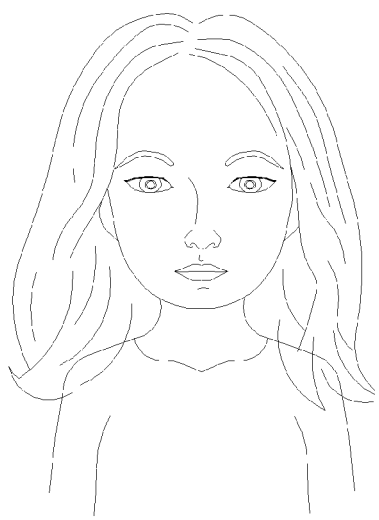
FIG. 5 is a diagram illustrating an example of a user interface for generating an avatar according to a comparative example.
Figure 5:
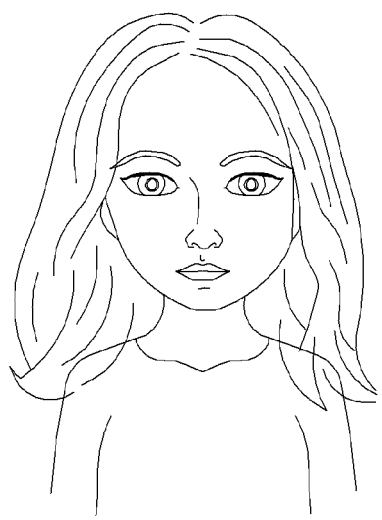
Figure 5:
Figure 5:
Figure 5:
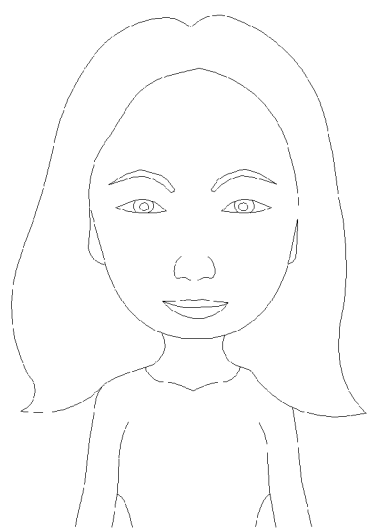
Figure 5:
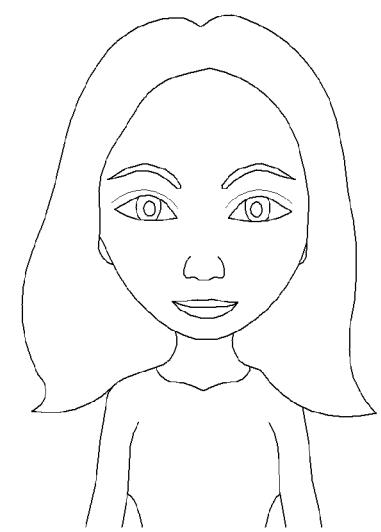

FIG. 5 is a diagram illustrating an example of a user interface for generating an avatar according to a comparative example.

Referring to FIG. 5, in the related art, a first avatar 520 may be generated using a first user image 510. The first user image 510 may be an image acquired from a camera (e.g., the camera module 180 of FIG. 1) and may not be corrected. Alternatively, the first user image 510 may be obtained by removing only noise from an image obtained from the camera module 180. Conventionally, by generating the first avatar 520 using the first user image 510, other characteristics other than a user's face may not be reflected. In the disclosure, a second avatar 540 may be generated using a second user image 530. The second user image 530 may be obtained by correcting an image obtained from the camera module 180. The second user image 530 may be obtained by correcting the user's face based on a configuration of the electronic device 101 or a user input. In the disclosure, by generating the second avatar 540 using the second user image 530, an avatar similar to the user and revealing the user's personality may be provided.

Figure 6:
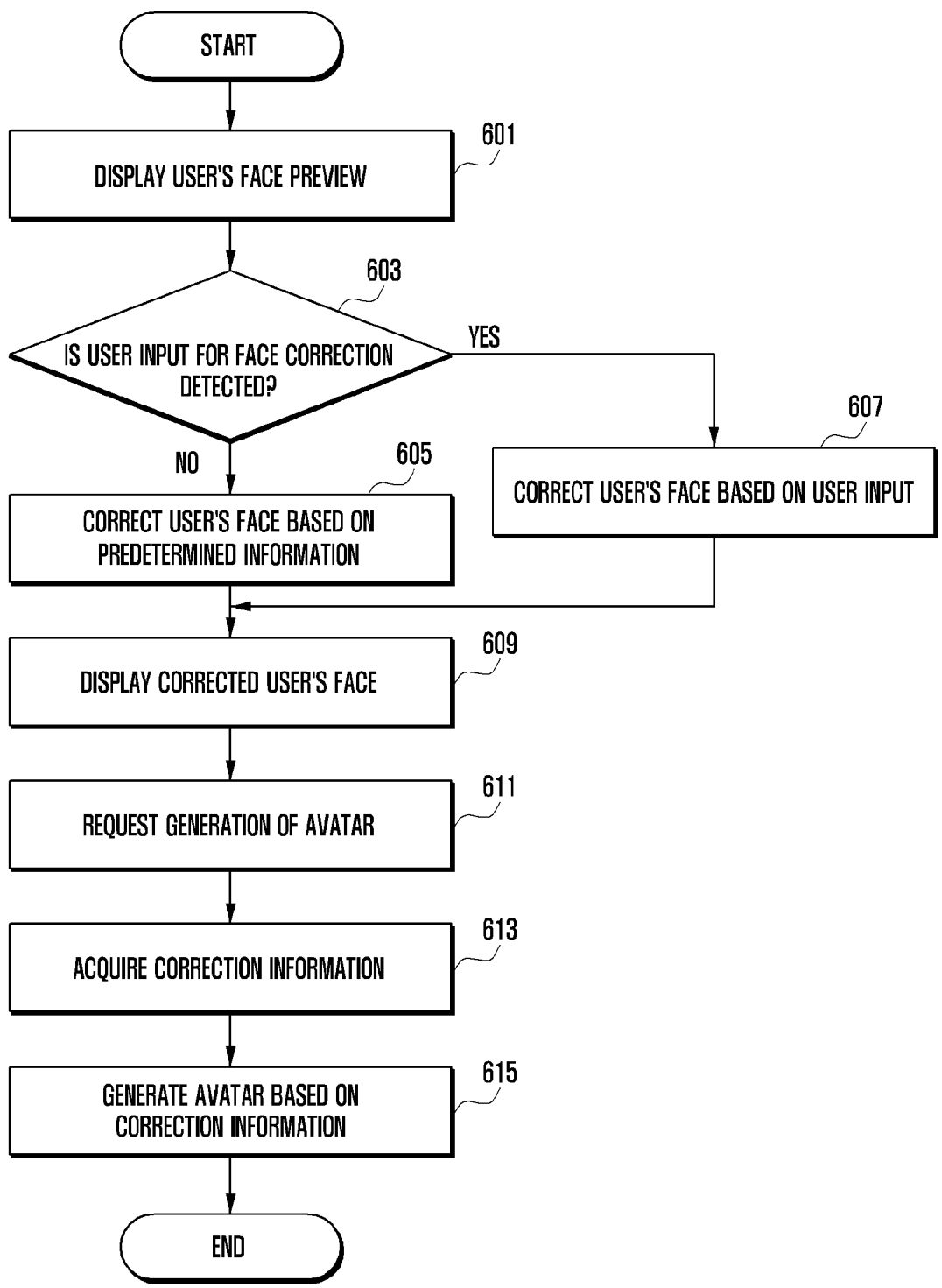
FIG. 6 is a flowchart illustrating a method of generating an avatar based on correction information in an electronic device according to various embodiments.

FIG. 6 is a flowchart illustrating a method of generating an avatar based on correction information in an electronic device according to various embodiments.

Referring to FIG. 6, in operation 601, a processor (e.g., the processor 120 of FIG. 1 or the function processing module 300 of FIG. 3) of an electronic device (e.g., the electronic device 101 of FIG. 1) may display a user's face in a preview form on a display (e.g., the display device 160). The processor 120 (e.g., the display control module 320) may display the user's face acquired from a camera (e.g., the camera module 180 of FIG. 1) in an avatar photographing mode, on the display device 160 in a preview state. Since operation 601 is the same as or similar to operation 401, a detailed description thereof is omitted.

In operation 603, the processor 120 (e.g., the image processing module 320) may sense whether a user input for face correction is detected. The user input may be for selecting an area to be corrected or for adjusting a degree of correction. For example, the processor 120 may detect a user input from the user's face displayed in the preview state. The processor 120 may perform operation 605 when the user input is not detected (NO), and may perform operation 607 when the user input is detected (YES).

When the user input is not detected (NO), in operation 605, the processor 120 (e.g., the image processing module 320) may correct the user's face based on predetermined information. Correction information for correcting the user's face according to at least one of gender, age, race, or country of the user of the electronic device 101 may be configured in the electronic device 101. The processor 120 may correct at least one of a face shape correction, a skin color correction, an eyes/nose/mouth correction, a lighting adjustment, and a left and right inversion with respect to the face area according to the predetermined information. Since operation 605 is the same as or similar to operation 405, a detailed description thereof is omitted.

When the user input is detected (YES), in operation 607, the processor 120 (e.g., the image processing module 320) may correct the user's face based on the user input. The processor 120 may determine correction information (e.g., a correction area and a correction degree) based on the user input, and may correct the user's face based on the determined correction information. Alternatively, the processor 120 may correct the correction area selected by the user input to the most appropriate degree of correction according to the configuration of the electronic device 101. The processor 120 may detect the user input from the user's face displayed in the preview state, a selection button (or an icon) for selecting the correction area, or a correction adjustment bar (or a button) for adjusting a degree of correction. The processor 120 may select the area to be corrected based on the user input and may select the degree of correction. Since operation 607 is the same as or similar to operation 407, a detailed description thereof is omitted.

In operation 609, the processor 120 (e.g., the display control module 320) may display the corrected user's face. The processor 120 may reflect, on the user's face, article (e.g., the correction area or the degree of correction) corrected based on the predetermined information or the detected user input in real time, thereby displaying the user's face on the display device 160. Since operation 609 is the same as or similar to operation 409, a detailed description thereof is omitted.

In operation 611, the processor 120 (e.g., the avatar generation module 340) may receive a request for generation of an avatar. When the user's face acquired in the avatar photographing mode is corrected in the preview state and a photographing button is selected, the processor 120 may determine that there is the request of generation of the avatar from the user. The processor 120 may acquire an image (or a user image) including the corrected user's face based on the avatar generation request. Since operation 607 is the same as or similar to operation 407, a detailed description thereof is omitted.

In operation 613, the processor 120 (e.g., the avatar generation module 340) may acquire correction information. The processor 120 may store an image before correction (e.g., an original image) or an image after correction (e.g., a corrected image) in a memory (e.g., the memory 130 of FIG. 1). The processor 120 may acquire the correction information from the image (e.g., the corrected image) acquired by the avatar generation request. The correction information may include at least one of a correction area, a degree of correction, and a correction item. The correction area may indicate a corrected position (or area), and may indicate, for example, which areas among face shape, skin color, eyes, nose, and mouth have been corrected. The degree of correction may indicate how much the correction area has been corrected. The correction item may include whether the lighting is corrected or whether the left and right inversion is performed. For example, when the lighting is corrected, the correction item may include a location of the lighting or brightness of the lighting.

In operation 615, the processor 120 (e.g., the avatar generation module 340) may generate the avatar based on the correction information. The processor 120 may generate the avatar based on the image before correction (e.g., the original image) and may apply the correction information to the generated avatar. For example, the processor 120 may apply the correction information to the avatar by generating an avatar that resembles the user and increasing the size of the eyes of the avatar according to the correction information or by correcting the face shape of the avatar to be slim. The processor 120 may display the generated avatar on the display device 160. According to various embodiments, the processor 120 may apply a filter or add an item to the generated avatar based on an additional user input.

Figure 7:
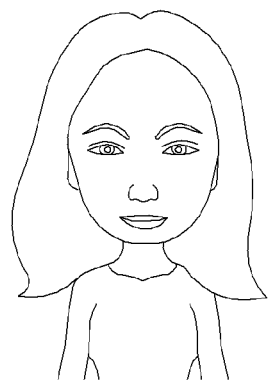
FIG. 7 is a diagram illustrating an example of generating an avatar based on a degree of correction according to various embodiments.
Figure 7:
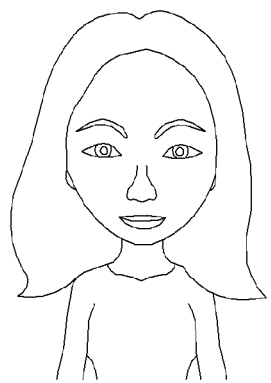
Figure 7:
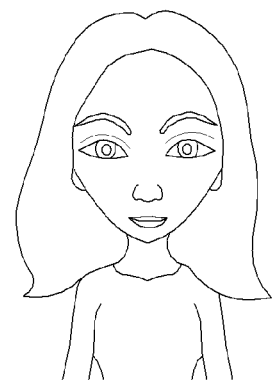

FIG. 7 is a diagram illustrating an example of generating an avatar based on a degree of correction according to various embodiments.

Referring to FIG. 7, a processor (e.g., the processor 120 of FIG. 1 or the function processing module 300 of FIG. 3) of an electronic device (e.g., the electronic device 101 of FIG. 1) may generate an avatar based on correction information. The correction information may be included in a corrected image, may be acquired from the corrected image, or may be separately stored in a memory (e.g., the memory 130 of FIG. 1). For example, when each piece of information included in the correction information is different from each other, the processor 120 may generate different avatars. A first avatar 710 may be corrected with first correction information, a second avatar 720 may be corrected with second correction information, and a third avatar 730 may be corrected with third correction information. The first correction information may have a lower degree of correction than the second correction information, and the second correction information may have a lower degree of correction than the third correction information. Alternatively, the first correction information may have a different correction area or a different degree of correction from the second correction information, and the second correction information may have a different correction area or a different degree of correction from the third correction information. For example, the first correction information can be obtained by reducing the face shape by 5% and expanding the eye size to 5%, the second correction information can be obtained by correcting the skin color and raising the nose by 5%, and the third correction information can be obtained by reducing the face shape by 10% and increasing the eye size to 10%.

Figure 8:
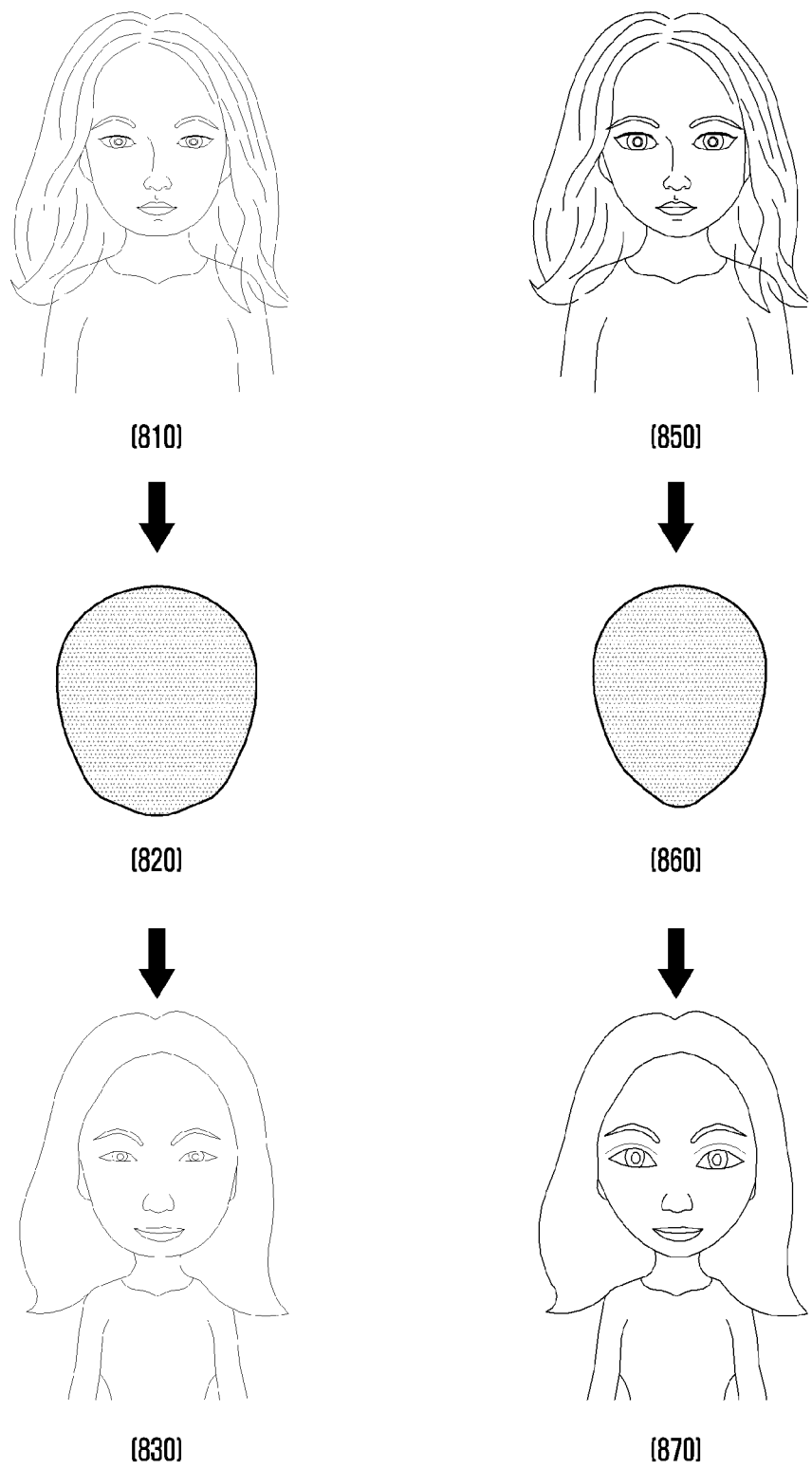
FIG. 8 is a diagram illustrating an example of differently applying an avatar model based on a degree of correction according to various embodiments.

FIG. 8 is a diagram illustrating an example of differently applying an avatar model based on a degree of correction according to various embodiments.

Referring to FIG. 8, a processor (e.g., the processor 120 of FIG. 1 or the function processing module 300 of FIG. 3) of an electronic device (the electronic device 101 of FIG. 1) may select an avatar model based on correction information and may generate an avatar. For example, the processor 120 may generate an avatar by selecting an avatar model based on the correction information and configuring a texture of the avatar model based on the corrected image. For example, when each piece of information included in the correction information is different from each other, the processor 120 may select different avatar models to generate the avatar. The processor 120 may select a first avatar model 820 using a first image 810 and may generate a first avatar 830 using the first avatar model 820. The processor 120 may select a second avatar model 860 using a second image 850 and may generate a second avatar 870 using the second avatar model 860. The first image 810 may be an image before correction (or an original image), and the second image 850 may be an image after correction (or a corrected image). The first image 810 may be an image before correction, and the processor 120 may select the first avatar model 820 with a round jawline, and may use the first avatar model 820 to generate the first avatar 830 with the round jawline. The second image 850 may be an image after correction, and the processor 120 may select the second avatar model 860 with a thin jawline (or sharp), and may use the second avatar model 860 to generate the second avatar 870 with the thin jawline.

Figure 9:
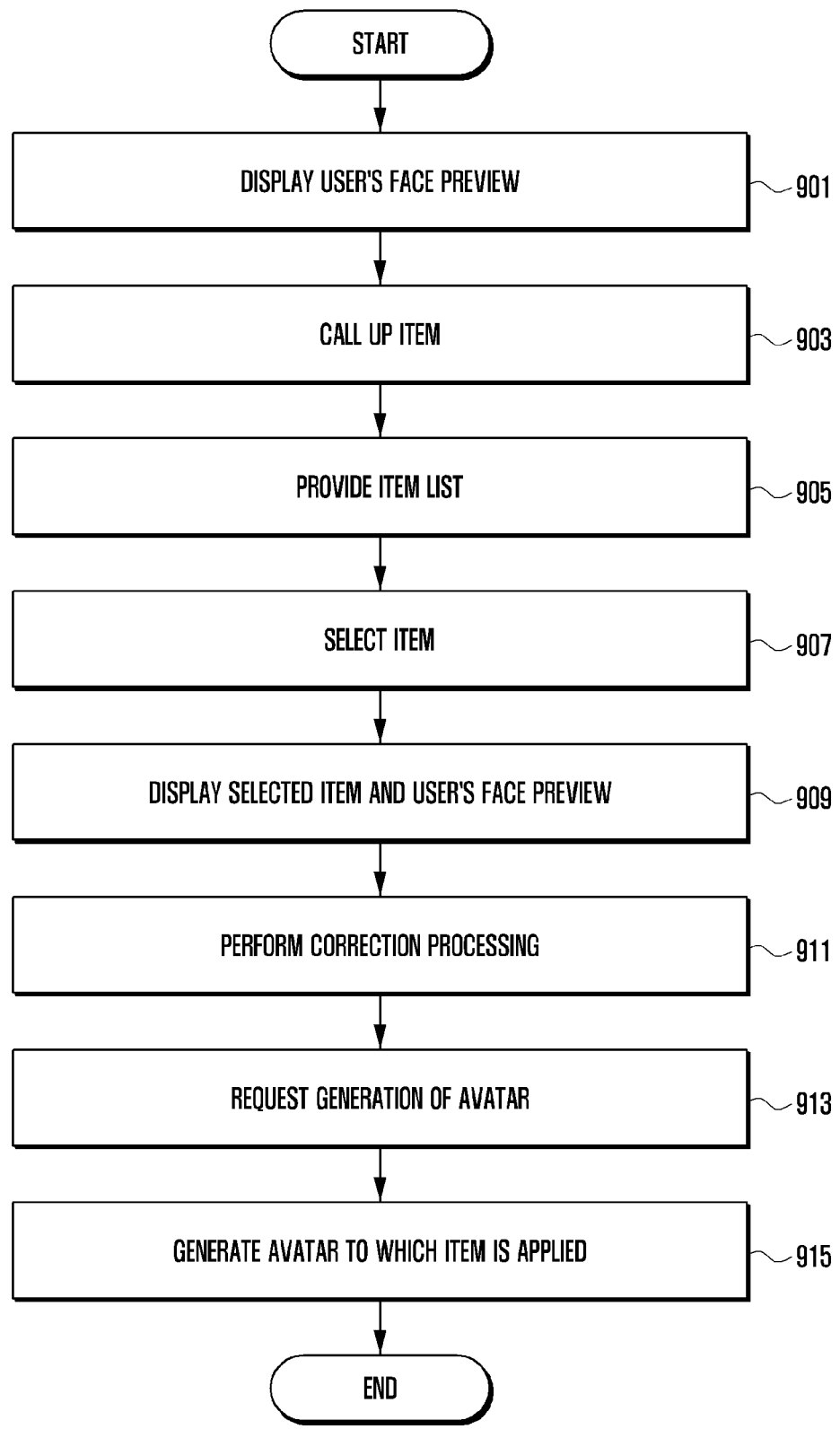
FIG. 9 is a flowchart illustrating a method of generating an avatar to which an item is applied in an electronic device according to various embodiments.

FIG. 9 is a flowchart illustrating a method of generating an avatar to which an item is applied in an electronic device according to various embodiments.

Referring to FIG. 9, in operation 901, a processor (e.g., the processor 120 of FIG. 1, or the function processing module 300 of FIG. 3) of an electronic device (e.g., electronic device 101 of FIG. 1) may display a user's face in a preview form on a display (e.g., the display device 160). The processor 120 (e.g., the display control module 320) may display the user's face acquired from a camera (e.g., the camera module 180 of FIG. 1) on the display device 160 in a preview state in an avatar photographing mode. Since operation 901 is the same as or similar to operation 401 or 601, a detailed description thereof is omitted.

In operation 903, the processor 120 (e.g., the display control module 320) may call up an item (or a sticker or an accessory). The item may include all types of objects or effects that can be added to the user's face or background which is displayed in a preview form. The processor 120 may provide a user interface including an item button for calling up the item. The user interface may include the item button together with the user's face displayed in the preview form of operation 901. When the item button is selected (or touched) by the user, the processor 120 may determine that the user has called up the item. According to various embodiments, the processor 120 may build a database in advance so that items used (or applied) in a general photographing mode can be used in the avatar photographing mode.

In operation 905, the processor 120 (e.g., the display control module 320) may provide an item list. When the item button is selected, the processor 120 may display an item list including at least one item on the display device 160. The item list may include buttons for each item type, and when the item type button is selected, the processor 120 may provide various items included in the item type. According to various embodiments, the processor 120 may preferentially provide an item that is most searched for based on big data or a usage history of the electronic device 101

In operation 907, the processor 120 (e.g., the display control module 320) may receive a selection of the item. The processor 120 may receive the selection of the item based on a user input. For example, the processor 120 may receive a selection of one item from among at least one item included in the item list from the user.

In operation 909, the processor 120 (e.g., the display control module 320) may display the selected item and the user's face as a preview. When the item is selected, the processor 120 may position the selected item on the user's face or background in the selected item type. For example, when the selected item is a hat, the processor 120 may display the hat on the user's head, and when the selected item is a cloud, the processor 120 may display the cloud in the background. According to various embodiments, the processor 120 may change the size or position of the selected item based on the user input. The processor 120 may store item information corresponding to the selected item. For example, the item information may include at least one of an identifier, name, type, location, and size.

In operation 911, the processor 120 (e.g., the image processing module 320) may correct the user's face displayed in the preview. The processor 120 may correct the user's face displayed in the preview based on a configuration of the electronic device 101 or the user input. The processor 120 may correct the user's face and may display the corrected user's face. Since operation 911 is the same as or similar to operation 405 or 605, a detailed description thereof is omitted. Alternatively, operation 911 may be omitted. The processor 120 may remove noise from the user's face to which the item is applied, and may generate an avatar.

In operation 913, the processor 120 (e.g., the avatar generation module 340) may receive a request of generation of the avatar. The processor 120 may correct the user's face acquired in the avatar photographing mode in a preview state, and when a photographing button is selected, the processor 120 may determine that there is the request for generation of the avatar from the user, and may acquire an image (or a user image) including the corrected user's face. Since operation 913 is the same as or similar to operation 407 or 607, a detailed description thereof is omitted.

In operation 915, the processor 120 (e.g., the avatar generation module 340) may generate an avatar to which the selected item is applied. The processor 120 may change the size or position of the selected item to fit the avatar and may apply the change to the avatar. Since the avatar may be generated differently from the user's face, the processor 120 may process the item to fit the avatar. When the item size or location is changed by the user, the processor 120 may apply the item to the avatar based on item information on the changed item size or location. The processor 120 may display the avatar to which the item is applied on the display device 160. After generating the avatar, the processor 120 may change the avatar based on an additional user input.

Figure 10:
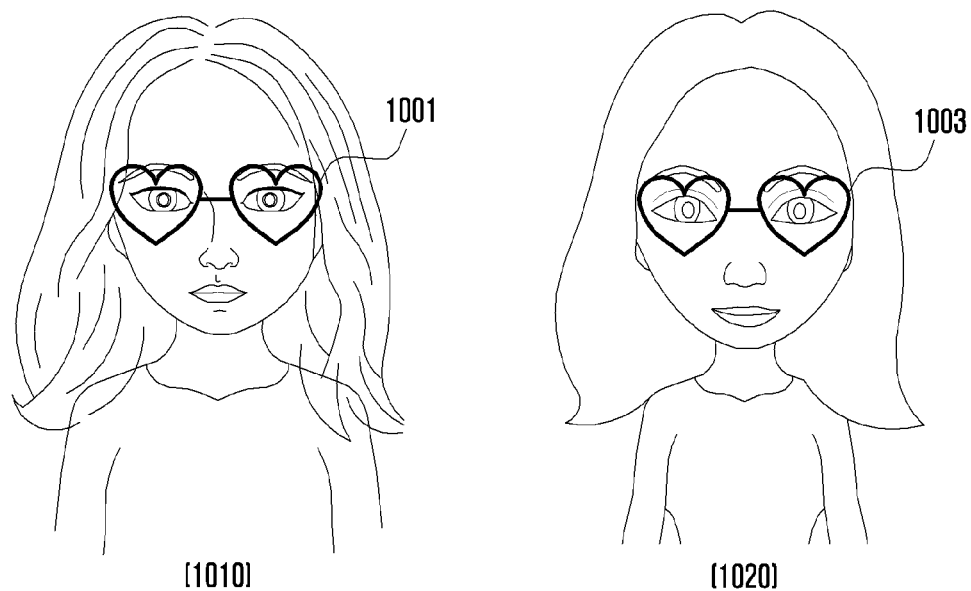
FIG. 10 is a diagram illustrating an example of generating an avatar to which an item is applied according to various embodiments.

FIG. 10 is a diagram illustrating an example of generating an avatar to which an item is applied according to various embodiments.

Referring to FIG. 10, a processor (e.g., the processor 120 of FIG. 1 or the function processing module 300 of FIG. 3) of an electronic device (the electronic device 101 of FIG. 1) may generate an avatar 1020 using a user image 1010. The user image 1010 may be a corrected image including the user's face, and may include an image item 1001. The avatar 1020 may be generated using the user image 1010 and may include an avatar item 1003. The image item 1001 and the avatar item 1003 may be the same or different. In order to apply the image item 1001 to the avatar 1020, the processor 120 may generate the avatar item 1003 by changing an item (e.g., the image item 1001) according to the avatar. Alternatively, the processor 120 may apply the image item 1001 to the avatar 1020 as it is.

A method of operating an electronic device (e.g., the electronic device 101 of FIG. 1) according to various embodiments may include: displaying a user's face acquired from a camera of the electronic device in a preview state; correcting the user's face based on a configuration related to face correction; acquiring, when an avatar generation request is received, correction information corresponding to the corrected user's face; and generating an avatar using the acquired correction information.

The generating may include acquiring an image including the corrected user's face; and generating the avatar based on the acquired image.

The generating may further include: selecting an avatar model based on the correction information; and generating the avatar by configuring a texture of the selected avatar model based on the image including the corrected user's face.

The selecting may include selecting the avatar model based on the correction information; or selecting the avatar model by integrating information included in the correction information.

The generating may include generating the avatar based on a user image including the user's face before correction; and applying the correction information to the generated avatar.

The method may further include: adding an item to the user's face when an item addition request is received; changing a size and position of the item based on a user input corresponding to the item; and applying the item to the avatar based on item information on the changed size or position of the item.

Various embodiments of the disclosure disclosed in the specification and drawings are merely provided with specific examples to easily explain the technical content of the disclosure and to aid understanding of the disclosure, and are not intended to limit the scope of the disclosure. Therefore, the scope of the disclosure should be construed that all changes or modified forms derived based on the technical idea of the disclosure in addition to the embodiments disclosed herein are included in the scope of the disclosure.

The invention claimed is:

1. An electronic device, comprising:
a camera;
a memory;
a display; and
a processor, wherein the processor is configured to:
    display a user's face acquired from the camera set in an avatar photographing mode on the display in a preview state,
    store an original image including the user's face in the memory,
    correct the user's face displayed in the preview state based on a configuration related to face correction, wherein the configuration related to the face correction includes at least one of a configuration of the electronic device or a user input, and the configuration of the electronic device includes correction information for correcting the user's face according to at least one of gender, age, race, or country of the user of the electronic device,
    display the corrected user's face,
    acquire a corrected image including the corrected user's face when an avatar generation request is received,
    store the corrected image in the memory,
    acquire correction information from the corrected image, and
    generate an avatar based on the original image, and apply the acquired correction information to the generated avatar.

2. The electronic device of claim 1, wherein the processor is configured to:
    adjust the configuration related to the face correction based on a user input received during at least a portion of the displaying; and
    display the corrected user's face on the display based on the adjusted configuration related to the face correction.

3. The electronic device of claim 1, wherein the processor is configured to:
    add, when an item addition request is received, an item to the user's face; and
    generate the avatar to which the item is applied according to the item generation request.

4. The electronic device of claim 3, wherein the processor is configured to:
    apply, when a size or position of the item is changed by a user input corresponding to the item, the item to the avatar based on item information on the changed size or position of the item.

5. The electronic device of claim 1, wherein the processor is configured to:
    provide an item list including at least one item based on a user input for calling up an item;
    receive a selection of any one item from the item list; and
    display the item on the user's face or a background based on a type of the selected item.

6. The electronic device of claim 5, wherein the processor is configured to:
    apply the item to the avatar based on information on the item displayed on the user's face or the background.

7. The electronic device of claim 1, wherein the processor is configured to:
    apply a filter to the generated avatar or add an item thereto based on an additional user input.

8. The electronic device of claim 1, wherein the acquired correction information includes at least one of a correction area, a degree of correction, or a correction item.

9. The electronic device of claim 8, wherein the processor is configured to:
   select an avatar model based on the correction information; and
   generate the avatar by configuring a texture of the selected avatar model based on an image including the corrected user's face.

10. The electronic device of claim 9, wherein the processor is configured to:
    select the avatar model based on the correction information; or
    select the avatar model by integrating information included in the correction information.

11. The electronic device of claim 1, wherein the processor is configured generate different avatars according to the correction information.

12. A method of operating an electronic device, the method comprising:
    displaying a user's face acquired from a camera of the electronic device set in an avatar photographing mode in a preview state;
    storing an original image including the user's face in a memory;
    correcting the user's face displayed in the preview state based on a configuration related to face correction wherein the configuration related to the face correction includes at least one of a configuration of the electronic device or a user input, and the configuration of the electronic device includes correction information for correcting the user's face according to at least one of gender, age, race, or country of the user of the electronic device;
    displaying the corrected user's face;
    acquiring, when an avatar generation request is received, correction information corresponding to the corrected user's face;
    storing a corrected image including the corrected user's face in the memory; and
    generating an avatar based on the original image, and applying the acquired correction information to the generated avatar.

13. The method of claim 12, wherein the generating comprises:
    selecting an avatar model based on the correction information; and
    generating the avatar by configuring a texture of the selected avatar model based on an image including the corrected user's face.

* * * * *